United States Patent
Nauheimer et al.

(10) Patent No.: US 12,529,358 B2
(45) Date of Patent: Jan. 20, 2026

(54) WIND TURBINE BLADE INCLUDING TWO LIGHTNING DOWN CONDUCTOR ARRANGEMENTS AND WIND TURBINE

(71) Applicant: Siemens Gamesa Renewable Energy Innovation & Technology, S.L., Sarriguren (ES)

(72) Inventors: Michael Nauheimer, Aalborg (DK); Sri Markandeya Rajesh Ponnada, Boucherville (CA); Victor March Nomen, Sant Cugat del Valles (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 18/719,147

(22) PCT Filed: Nov. 29, 2022

(86) PCT No.: PCT/EP2022/083615
§ 371 (c)(1),
(2) Date: Jun. 12, 2024

(87) PCT Pub. No.: WO2023/117326
PCT Pub. Date: Jun. 29, 2023

(65) Prior Publication Data
US 2025/0067251 A1    Feb. 27, 2025

(30) Foreign Application Priority Data
Dec. 20, 2021   (EP) .................................... 21383164

(51) Int. Cl.
F03D 80/30     (2016.01)
F03D 1/06      (2006.01)
F03D 80/00     (2016.01)

(52) U.S. Cl.
CPC ......... F03D 80/301 (2023.08); F03D 1/0675 (2013.01); F03D 1/0681 (2023.08); F03D 80/003 (2023.08); F03D 80/30 (2016.05)

(58) Field of Classification Search
None
See application file for complete search history.

(56) References Cited

U.S. PATENT DOCUMENTS 8,096,765 B2 * 1/2012 Fritz ..................... F03D 1/0675
                                                        416/62
9,689,377 B2 * 6/2017 Klein ..................... F03D 80/40
(Continued)

FOREIGN PATENT DOCUMENTS

EP    2930355 A1 * 10/2015 ........... F03D 1/0675
EP    3106657 A1    12/2016
(Continued)

OTHER PUBLICATIONS

English translation of WO2017089591A1 (Year: 2017).*
(Continued)

*Primary Examiner* — Courtney D Heinle
*Assistant Examiner* — Esley Le Fisher
(74) *Attorney, Agent, or Firm* — Schmeiser, Olsen & Watts, LLP

(57) ABSTRACT

A wind turbine blade including two electrically conductive spar caps, two lightning down conductor arrangements, and a further electrical conductor, wherein the spar caps and the lightning down conductor arrangements extend along a spanwise direction of the blade at least between a root-side end portion and a tip-side end portion of the blade, wherein each of the spar caps is electrically connected to only one of the lightning down conductor arrangements within a section of the blade between the root-side end portion and the tip-side end portion, wherein the further electrical conductor (Continued)

Figure 1:
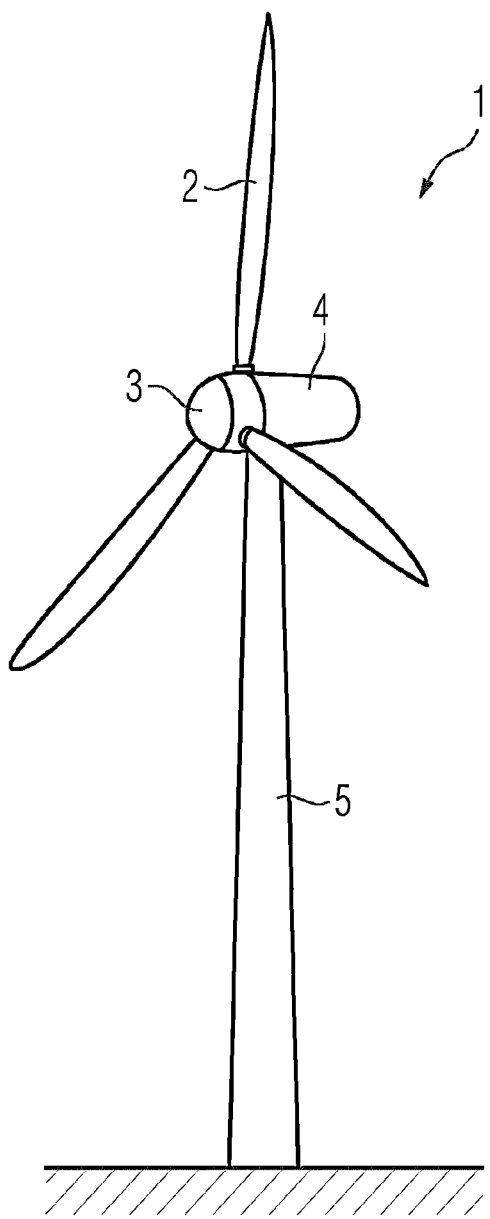

is electrically connected within the section to only one of the spar caps and/or to only one of the lightning down conductor arrangements at one or more connection positions is provided.

12 Claims, 4 Drawing Sheets

(56) References Cited

U.S. PATENT DOCUMENTS

| | | | | |
|---|---|---|---|---|
| 10,066,599 | B2* | 9/2018 | Ohlerich | B29D 99/0028 |
| 10,294,925 | B2* | 5/2019 | Klein | F03D 1/0675 |
| 10,330,087 | B2* | 6/2019 | March Nomen | F03D 80/30 |
| 11,215,167 | B2* | 1/2022 | Girolamo | F03D 1/0675 |
| 11,994,112 | B2* | 5/2024 | Hayden | H02G 13/40 |
| 12,012,938 | B2* | 6/2024 | Thwaites | F03D 80/30 |
| 12,023,878 | B2* | 7/2024 | Christiansen | B29C 70/885 |
| 12,129,832 | B2* | 10/2024 | Hansen | B29C 70/885 |
| 2013/0149153 | A1 | 6/2013 | Fujioka et al. | |
| 2018/0223798 | A1 | 8/2018 | Caruso et al. | |
| 2019/0211806 | A1 | 7/2019 | Girolamo | |
| 2023/0407848 | A1* | 12/2023 | Hansen | F03D 1/0675 |
| 2024/0209840 | A1* | 6/2024 | Halajova | F03D 17/013 |
| 2025/0198392 | A1* | 6/2025 | Palmer | F03D 80/301 |

FOREIGN PATENT DOCUMENTS

| | | | | |
|---|---|---|---|---|
| KR | 102250535 B1 | * | 5/2021 | |
| WO | WO-2011080177 A1 | * | 7/2011 | F03D 1/0675 |
| WO | WO-2017089591 A1 | * | 6/2017 | F03D 1/0675 |

OTHER PUBLICATIONS

English translation of EP2930355A1 (Year: 2015).*
English translation of KR102250535B1 (Year: 2021).*
PCT International Search Report and Written Opinion of International Searching Authority mailed Feb. 15, 2023 corresponding to PCT International Application No. PCT/EP2022/083615 filed Nov. 29, 2022.
European Search Report mailed May 25, 2022 corresponding to EP Application No. 21383164.7, filed Dec. 2021.

* cited by examiner

WIND TURBINE BLADE INCLUDING TWO LIGHTNING DOWN CONDUCTOR ARRANGEMENTS AND WIND TURBINE

CROSS-REFERENCE TO RELATED APPLICATIONS

This application is a national stage of PCT Application No. PCT/EP2022/083615, having a filing date of Nov. 29, 2022, claiming priority to EP Application No. 21383164.7, having a filing date of Dec. 20, 2021, the entire both contents of which are hereby incorporated by reference.

FIELD OF TECHNOLOGY

The following relates to a wind turbine blade comprising two electrically conductive spar caps, two lightning down conductor arrangements, and at least one further electrical conductor, wherein the spar caps and the lightning down conductor arrangements extend along a spanwise direction of the blade at least between a root-side end portion and a tip-side end portion of the blade, wherein each of the spar caps is electrically connected to only one of the lightning down conductor arrangements within a section of the blade between the root-side end portion and the tip-side end portion. Furthermore, the following relates to a wind turbine.

BACKGROUND

In wind turbine blades of wind turbines used for the generation of electrical energy, electrical conductors or electrically conductive blade segments may be present in the blades to allow for the grounding of lightning strikes hitting the blade. In addition to conductive structures for the conduction and the grounding of lightning currents, also additional electrical conductors may be present in the shell and/or in the interior of the blade. These additional conductors may for instance connect electrical components that are arranged in the blade with other structures in the blade or in the remainder of the wind turbine. These additional wires have to be electrically bonded to the conductors used for the grounding of lightning strikes in order to avoid large potential differences and therefore the occurrence of large voltages between the conductors in the wind turbine blade in case of a lightning strike.

Therefore, it is known to apply electrical bonds between all participant conductors in a blade at multiple positions along the spanwise length of the blade, in particular between the two electrically conductive spar caps and the other conductors. By these electrical connections, an equalization of the potentials of the different conductors is obtained so that the potential of the conductors is equalized at multiple positions along the spanwise length of the blade. The electrical bonding reduces the maximum voltage which can be present between the conductors so that the occurrence of large voltages between the conductors is prevented, especially in the case that the individual conductors show a different spanwise voltage distribution, for instance due to different conductor geometries.

However, this solution is complex to be realized during the manufacturing of the wind turbine blade. In embodiments, there are spanwise positions, where no access to the blade interior is possible, so that the application of an electrical connection at these positions during the manufacture is tedious. For instance, in a wind turbine blade with a length of 70 m, only the first 20 m to 30 m from the root side end of the blade can be accessible by a worker for applying the electrical connections. For the remainder of the spanwise length, the application of the connections is difficult and must occur by other means than the worker located in the interior of the blade.

Therefore, there is a need for a wind turbine blade with an improved integration of at least one further electrical conductor in the electrical system of the wind turbine blade.

SUMMARY

An aspect relates to an improved wind turbine blade, which in particular facilitates the electrical integration of a further electrical conductor in the wind turbine blade.

According to embodiments of the invention, this problem is solved by a wind turbine blade as initially described, wherein the further electrical conductor is electrically connected within the section to only one of the spar caps and/or to only one of the lightning down conductor arrangements at one or more connection positions.

The electrically conductive spar caps of the wind turbine blade are each connected to one lightning down conductor arrangement in a section of the blade which extends between the root-side end portion and the tip-side end portion of the blade. In embodiments, the two electrically conductive spar caps and/or the lightning down conductor arrangements may be connected to each other at the root-side end portion and/or at the tip-side end portion, but in the section in between, no connection is present between the electrically conductive spar caps and/or between the respective lightning down conductor arrangements that are each connected to only one of the spar caps. Hence, within this section, there is no electrical connection between the two spar caps and/or between lightning down conductor arrangements that are each assigned to a different one of the spar caps.

The at least one further electrical conductor, which is integrated in the wind turbine blade, is electrically connected to only one of the spar caps and/or to only one of the lightning down conductor arrangements in the section between the root-side end portion and the tip-side end portion. In other words, there is no electrical connection present between the further electrical conductor and the other spar cap, or the other lightning down conductor arrangement, respectively.

The further electrical conductor is connected to the spar cap and/or the assigned lightning down conductor arrangement at one or more connection positions. At the connection positions, an electrical connection between the further electrical conductor and the down conductor is established, in particular for electrical bonding, or for obtaining a potential equalization, respectively.

Embodiments of the invention are based on the observation that the absolute voltage differences in the wind turbine blade can be kept within a range for safety voltage differences also when the further electrical conductor is connected to only one of the lightning down conductor arrangements. This may be feasible in particular because the further electrical conductor introduced inside the blade has a higher inductance compared to the total inductance obtained for the set composed of one of the spar caps and the at least one metallic conductor of the respective lightning down conductor arrangement.

The wind turbine blade comprises two spar caps, wherein one spar cap is arranged at a suction side and the other one is arranged at a pressure side of the blade. The spar caps may extend in spanwise direction of the blade, or in radial direction of the blade, respectively, from a root-side end of the blade into the tip-side end portion, or close to the tip, respectively. Each of the two spar caps may have a different geometry due to the different surface geometry of the wind turbine blade at the respective side. Therefore, each of the spar caps may show a different voltage distribution over the spanwise length of the wind turbine blade. Since also the cross-sectional area of the spar caps may vary in spanwise direction, the voltage drop over the spar cap may be in particular non-linear in spanwise direction of the blade.

The lightning down conductor arrangements may each comprise at least one lightning down conductor, wherein the lightning down conductor may be for instance a cable or a busbar with a constant cross section over the spanwise length. Therefore, the lightning down conductor arrangements would each show initially a linear voltage distribution over their spanwise length. However, due to the multiple connections to one of the spar caps, also the voltage drop in the lightning down conductor arrangements may be non-linear over the spanwise length of the blade.

The attachment of the further electrical conductor to only one of the spar caps and/or to only one of the lightning down conductor arrangements within the section has the advantage that the wind turbine blade can be manufactured with less effort, since the number of electrical connections that have to be established during manufacture can be reduced. Less connections within the section of the blade between the tip-side end portion and the root-side end portion are required.

In embodiments, electrical connections between the pressure side and the suction side of the blade are not needed in the section of the blade. These electrical connections may be difficult to apply during the manufacture of the wind turbine blade, since they have to span between the spar caps and hence between a suction side and a pressure side of the wind turbine blade. In embodiments, in wind turbine blades, which comprise two separately fabricated half-shells, the subsequent integration of these electrical connections is tedious. By connecting the further connector to only one of the spar caps and/or to only one of the lightning down conductor arrangements at one or more connection positions, the manufacturing of the wind turbine blade can be significantly facilitated.

The further electrical conductor is electrically connected to only one of the spar caps and/or to only one of the lightning down conductor arrangements within the section. Within the section, each of the spar caps is connected to only one of the lightning down conductor arrangements, so that an electrical connection between the further electrical conductor and one of the spar caps and/or one of the lightning down conductor arrangements can be established by connecting it to the spar cap and/or the respective lightning down conductor arrangement. This allows for instance to integrate the further electrical conductor in one half-shell of a blade made of two separately casted half-shells.

However, also in wind turbine blades, which are fabricated in another method, for instance wind turbine blades casted in a single step also known as one-shot or integral blades, the connection of the further electrical conductor to only one of the spar caps and/or to only one of the lightning down conductor arrangements may be used, since the effect of the avoidance of large voltage differences between the different conductors in the wind turbine blade can also be achieved. Furthermore, also the manufacture of integral blades can be facilitated, in particular for further electrical conductors that are bonded to a spar cap and/or to a lightning down conductor arrangement in the lower mold region of the blade, which is more accessible during manufacture.

In particular for long wind turbine blades, which show a spanwise length of 60 m or more, in which suction side and pressure side spar caps are differently shaped due to structural reasons, the voltage differences can be kept lower than risky values to avoid the occurrence of flashovers between the pressure side and the suction side conductors in case of a lightning strike hitting the wind turbine blades, or at least one of the spar caps and/or at least one of the lightning down conductor arrangements, respectively. The avoidance of flashovers between the different conductors in case of a lightning strike reduces the risk of lightning-induced damage to the blade. Furthermore, a reduction of manufacturing costs can be achieved.

In an embodiment, the section extends over at least 50% of the spanwise length of the blade. The spanwise length of the blade is defined as the length from the root-side end to the tip-side end of the blade and may also be called the radial direction of the blade.

In an embodiment, the section in which each of the spar caps is connected to only one lightning down conductor arrangement and in which the further electrical connector is connected to only one of the spar caps and/or to only one of the lightning down conductor arrangements, may extend over 60%, 70%, 80% or 90% of the spanwise length. It is also possible that the section spans over any value between 50% and 90% as well as over a spanwise length of more than 90% or the blade, respectively. The tip-side end portion and the root-side end portion may have together a length equal to the remainder of the entire spanwise length of the wind turbine blade.

In an embodiment, the further electrical conductor is connected to the spar cap and/or to the lightning down conductor arrangement at a plurality of connection positions, wherein the connection positions are offset in the spanwise direction of the blade.

The number of connection positions along the blade may depend on multiple parameters such as the insulation break down voltage between the respective conductors, the entire length of the blade, and/or the distance between the further electrical conductor and the lightning down conductor arrangement in the blade. In addition, the number of connection portions may also depend on electrical parameters of the further electrical conductor, for instance on its inductance, which is most significant for the conducting of the pulse-shaped lightning currents. In addition, also the resistance and/or the capacitance of the further electrical conductor may have an influence on the optimal number of connection positions along the length of the blade.

In an embodiment, the section comprises a root-side subsection adjacent to the root-side end portion, a tip-side subsection adjacent to the tip-side end portion and an intermediate subsection between the root-side subsection and the tip-side subsection, wherein in the root-side subsection and/or in the tip-side subsection, the distance between two adjacent connection positions is smaller than the intermediate subsection.

In other words, there are more connection points in the root-side subsection and in the tip-side subsection than in the intermediate subsection. Hence, the connection positions in the root-side subsection and/or the tip-side subsection may be arranged closer together than in the intermediate subsection. It is possible that one connection position is provided in the intermediate subsection and two or more connection positions are provided in the root-side subsection and the tip-side subsection, wherein the distance between the one connection position in the intermediate subsection and the closest connection position in spanwise direction is larger than the individual distances between the two connections positions in the root-side subsection and/or the tip-side subsection, respectively.

Commonly, an electrically conductive spar cap may have three different regions which each have a different cross-sectional area. The first region extends from the blade root to the intermediate subsection. The second region is the intermediate subsection arranged mid-span in the wind turbine blade. The third region extends from the intermediate subsection towards the tip-side end portion of the blade. In the intermediate subsection, the spar cap may have more or less a constant cross-sectional area, so that a voltage drops linearly over the spanwise length in the intermediate subsection. Closer to the root-side end of the blade and/or closer to the tip-side end of the blade, the cross-sectional area of the spar cap may be smaller, so that an increased voltage drop over the spanwise length of the blade occurs in these subsections.

To account for the increased voltage drops, the number of connection portions in the root-side subsection and the tip-side subsection may be increased, so that a better potential equalization and/or reduced voltage differences between the further electrical conductor and the spar cap, or the assigned lightning down conductor arrangement, respectively, can be obtained.

In an embodiment, the further electrical conductor is connected to the spar cap and/or the lightning down conductor arrangement at the connection position by at least one connection means. The connection means may be for instance a short cable which connects the further electrical conductor to the spar cap and/or the assigned lightning down conductor arrangement. Also, other types of connection means may be used, for instance electrically conductive metal elements, electrically conductive screws, clamps, brackets or the like. Also, a connection using electrically conductive fiber material, for instance sheets of a carbon fiber-based material, is possible.

In an embodiment, the further electrical conductor is arranged at a shear web structure of the blade and/or the further electrical conductor is arranged at or within a portion of a shell of the blade. The further electrical conductor may be arranged at a shear web structure, which spans in the interior of the blade between the two spar caps. The further electrical conductor may be attached to the shear web structure, wherein the electrical connection to one of the spar caps and/or the respective lightning down conductor arrangement at one half-shell of the blade occurs by using connection means as previously described.

In an embodiment, the spar caps, the lightning down conductor arrangements and the further electrical conductor are electrically connected in the root-side end portion at a root-side contact and/or in the tip-side end portion at a tip-side contact. By connecting the spar caps, the lightning down conductor arrangements and the one or more further electrical conductors at a tip-side contact and/or at a root-side contact, a mutual electrical integration of the spar caps, the lightning down conductor arrangements and the further electrical conductor in the lightning protection system of the wind turbine blade becomes possible.

Whether the further electrical conductor is connected to the spar cap and/or the lightning down conductor arrangements at a tip-side contact may depend on the length of the further electrical conductor. It is possible that the further electrical conductor spans from the root-side end of the blade to the tip-side end, so that a connection in the tip-side end portion becomes possible. It is alternatively possible that the further electrical conductor is shorter than the spanwise length of the blade so that it extends for instance from the root-side end only to a mid-span position of the wind turbine blade.

Whether a root-side contact is provided may depend on the type of the blade. It is equally possible that a root-side connection of the wind turbine blade occurs in the rotor hub, to which the wind turbine blade may be attached so that no root-side contact has to be provided.

In an embodiment, the further electrical conductor extends from the root-side end portion, wherein the further electrical conductor comprises a length of at least 10 m and/or wherein the further electrical conductor extends to the tip-side end portion.

In an embodiment, each of the spar caps and/or each of the lightning down conductor arrangements is connected to at least one further electrical conductor within the section. Hence, the blade may comprise two or more further electrical conductors, which are each attached to only one spar cap and/or to only one lightning down conductor arrangements.

The two spar caps and/or the two lightning down conductor arrangements may be connected each to one or more different further electrical conductors. This allows the integration of a plurality of further electrical conductors in the interior of the blade. In embodiments, a plurality of further electrical conductors is electrically connected and/or arranged in such manner that the number of further electrical conductors attached to a first spar cap and/or a first lightning down conductor arrangement is equal or different by one to the number of further electrical conductors attached to the other spar cap and/or the other lightning down conductor arrangement, respectively. Such a distribution of the plurality of further electrical conductors in the interior of the wind turbine blade is beneficial for obtaining only small voltage differences between the two spar caps and/or the different connectors attached to them.

In an embodiment, the further electrical conductor comprises one or more cables and a shield conductor, wherein the shield conductor is electrically connected to the spar cap and/or the lightning down conductor arrangement.

The further electrical conductor may in particular comprise one or more cables, or a bundle of cables, respectively, arranged within a shield conductor. For obtaining the desired electrical bonding, or the desired potential equalization, respectively, the shield conductor is connected to the spar cap and/or the lightning down conductor arrangement. This allows for using the cable of the electrical conductor for conducting signals and/or electrical power to one or more components of the wind turbine blade which require a respective electrical connection. In case of electrical power cables or signal cables, potential equalization may be done using a surge protection device electrically connected between the power cable or signal cable at one terminal of the surge protection device and the spar cap and/or the lightning down conductor arrangement at the other terminal.

In an embodiment, the further electrical conductor is connected to at least one sensor, at least one de-icing means, at least one anti-icing means and/or at least one actuator. The sensor, the de-icing means, the anti-icing means and/or the at least one actuator are arranged at the wind turbine blade. At a root-side end, the further electrical conductor may be connectable to a hub-side conductor to provide electrical power to the sensor, the de-icing means, the anti-icing means and/or the actuator. Additionally, or alternatively, the further electrical conductor may also be used to transmit control signals to one or more of these components. The actuator may be for instance coupled to an active flap of a wind turbine, so that the position of an active flap may be varied by the actuator.

In an embodiment, the spar caps comprise or consist of a carbon fiber-based material. A carbon fiber-based spar cap is electrically conductive and requires integration into a lightning protection system of the wind turbine blade to enable proper grounding in case of a lightning strike hitting the wind turbine blade.

In an embodiment, the blade comprises two half-shells forming a shell of the blade, wherein each half-shell comprises one of the spar caps. Such a type of wind turbine blade is also called a "butterfly blade". However, the electrical connection of the further electrical conductor to only one of the spar caps and/or to only one of the lightning down conductor arrangements in the section is also beneficial for other types of blades, for instance integral blades, as previously described.

BRIEF DESCRIPTION

Figure 2:
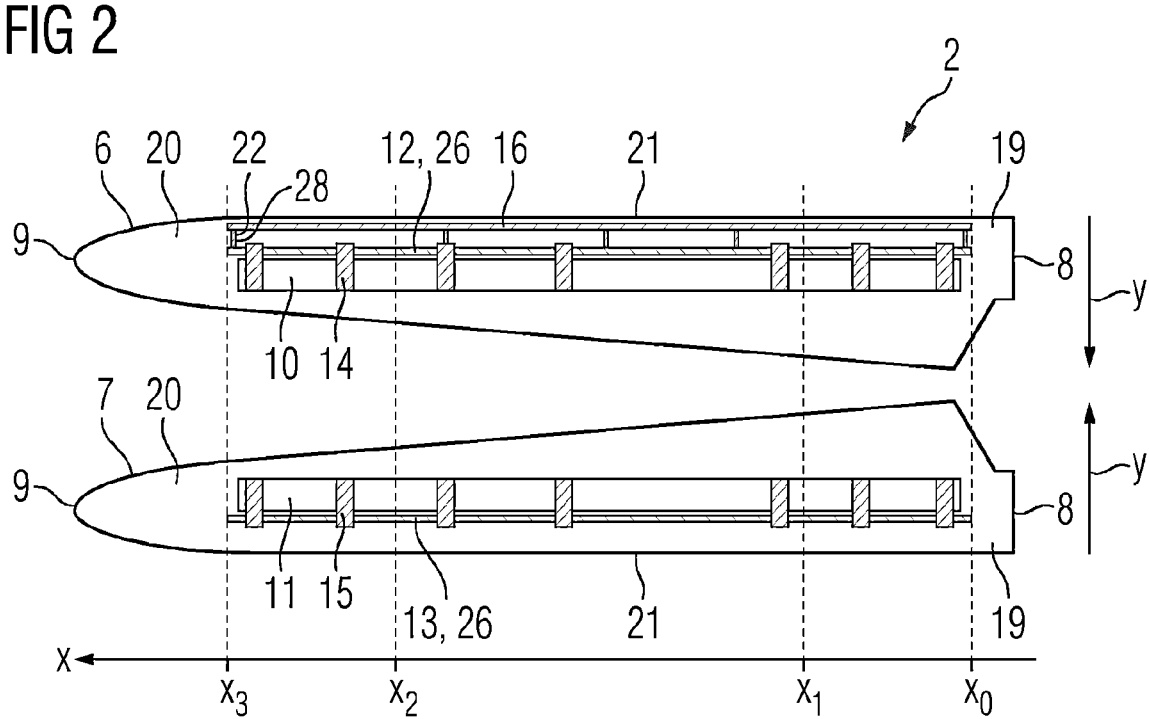
Figure 3:
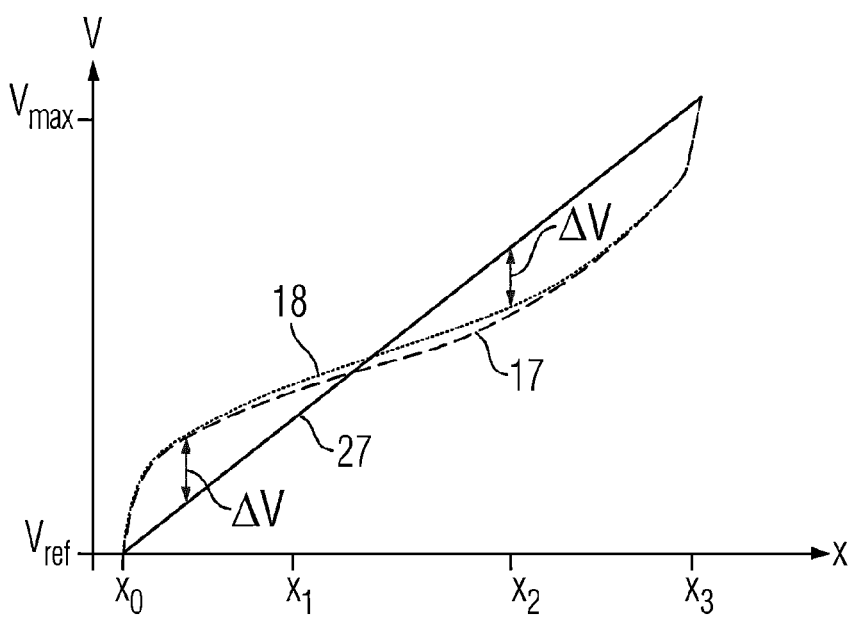
Figure 4:
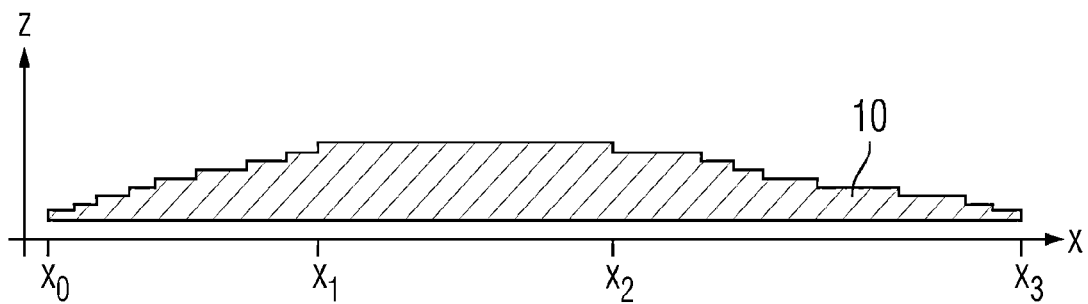
Figure 5:
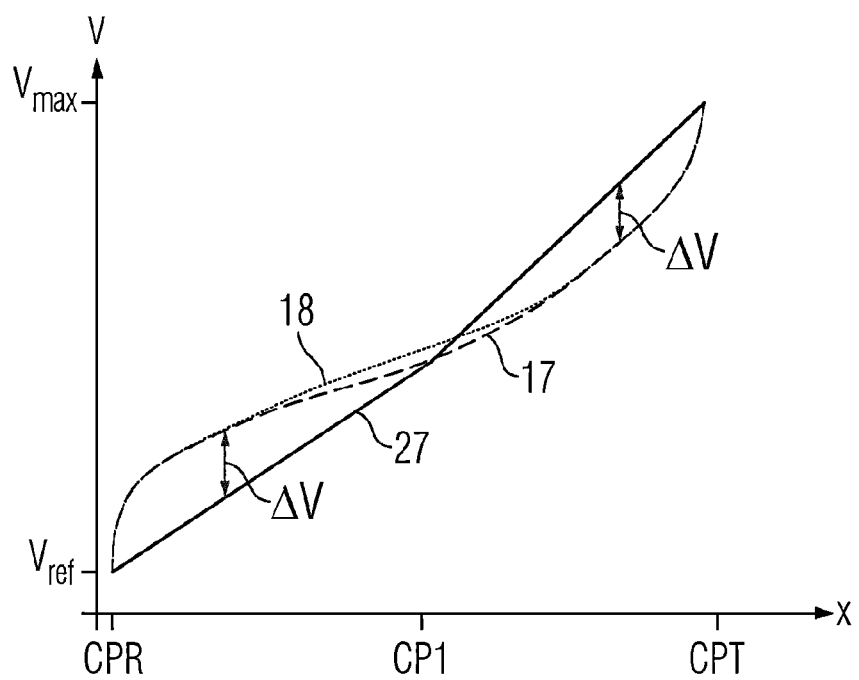
Figure 6:
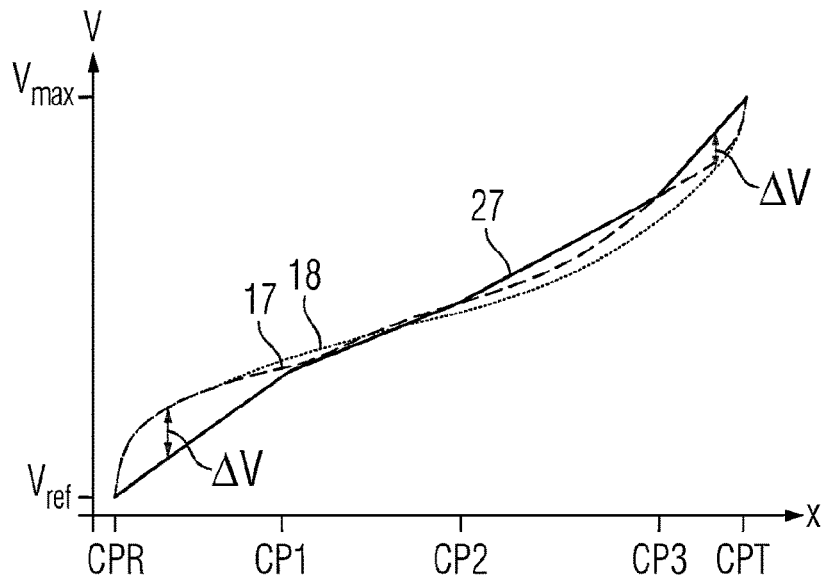
Figure 7:
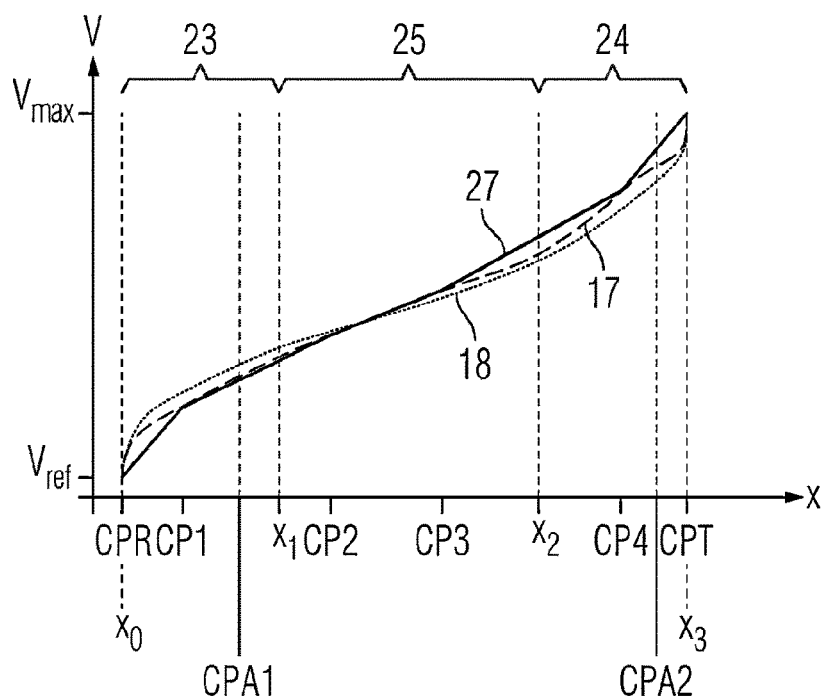

Some of the embodiments will be described in detail, with references to the following Figures, wherein like designations denote like members, wherein:

FIG. 1 shows an embodiment of a wind turbine;
FIG. 2 shows an embodiment of a wind turbine blade;
FIG. 3 shows a diagram depicting the voltage distribution in different conductors of a wind turbine blade;
FIG. 4 shows a schematic depiction of a cross-sectional area of a spar cap of a wind turbine blade;
FIG. 5 shows the voltage distribution in a first embodiment of a wind turbine blade;
FIG. 6 shows a diagram of the voltage distribution in a second embodiment of a wind turbine blade; and
FIG. 7 shows the voltage distribution in a third embodiment of a wind turbine blade.

DETAILED DESCRIPTION

In FIG. 1, an embodiment of a wind turbine 1 is shown. The wind turbine 1 comprises a plurality of wind turbines blades 2, which are attached to a hub 3 of the wind turbine 1. The hub 3 is attached to a nacelle 4, wherein the nacelle 4 is supported by a tower 5 of the wind turbine 1. Inside the nacelle 4, a plurality of components used for the generation and/or conversion of energy are arranged. The components may be used for transforming a rotational movement of the hub 3 into electrical energy, wherein the hub 3 is driven by the wind acting on the wind turbine blades 2.

In FIG. 2, an embodiment of a wind turbine blade 2 is shown. The wind turbine blade 2 comprises two half-shells 6, 7 which are shown separate from each other. For forming the entire blade 2, the pressure-side half-shell 6 and the suction-side half-shell 7 are attached together for forming the wind turbine blade 2.

The spanwise direction of blade 2, or its corresponding half-shells 6, 7, respectively, is denoted as x-axis describing the direction from a root-side end 8 of the blade 2 towards a tip-side end 9 of the blade 2. The chordwise direction extending from a leading edge to a trailing edge of the wind turbine blade 2 is denoted as y-axis. The height direction of the blade is orthogonal to the drawing plane and denoted as z-axis.

Each of the blade half-shells 6, 7 comprises a spar cap 10, 11 and a lightning down conductor arrangement 12, 13. The lightning down conductor arrangement 12 is attached to the electrically conductive spar cap 10 at a plurality of electrically conducive connections 14. The electrically conductive connections 14 are offset in the spanwise direction x of the wind turbine blade 2. Correspondingly, also the lightning down conductor arrangement 13 is attached by a plurality of electrically conductive connections 15 to the spar cap 11.

The lightning down conductor arrangements 12, 13 each comprise one or more lightning down conductors 26. The lightning down conductors 26 may be metallic and provided for instance as cables or busbars. In the depicted embodiment, lightning down conductor arrangements 12, 13 each comprise one lightning down conductor 26. The electrically conductive spar caps 10, 11 and the lightning down conductor arrangements 12, 13 form a lightning protection system (LPS) of the blade 2.

The wind turbine blade 2 comprises at least one further electrical conductor 16, which is arranged in the first half-shell 6 of the wind turbine blade 2. The further electrical conductor 16 is electrically connected to the lightning down conductor 26 of the lightning down conductor arrangement 12 that is attached to the spar cap 10 of the first half-shell 6.

The further electrical conductor 16 may comprise one or more cables and a shield conductor, wherein the shield conductor is electrically connected to only one of the spar caps 10, 11 and/or only one of the lightning down conductor arrangements 12, 13 within the section 21. For example, the further electrical conductor 16 may be connected to at least one sensor, at least one de-icing means, at least one anti-icing means and/or at least one actuator of the blade 2, so that the respective device may be powered and/or electrical signals to this device may be conducted.

The further electrical conductor 16 may be attached for instance to a shear web structure in the blade 2. Also, an arrangement of the further electrical conductor 16 at or embedded inside a portion of a shell of the wind turbine blade 2 is possible.

The further electrical conductor 16 may extend in spanwise direction x of the blade 2 from the root-side end 8 to the tip-side end 9. It is also possible that the further electrical conductor 16 only spans from the root-side end 8 to a midspan position. In an embodiment, the further electrical conductor 16 comprises a length of at least 10 m, in particular measured from the root-side end 8.

The spar caps 10, 11 may comprise or consist of a carbon-fiber based material so that they are electrically conductive. The lightning down conductor arrangements 12, 13 are used for grounding lightning strikes hitting the wind turbine blade 2 during operation of the wind turbine 1. When a lightning strike hits the wind turbine blade 2, a lightning current flows through the lightning down conductor arrangements 12, 13 and the electrically conductive spar caps 10, 11. The occurrence of a lightning strike causes a voltage drop over the spar caps 10, 11 and the lightning down conductor arrangements 12, 13.

In FIG. 3, the voltage distribution over the lightning down conductor arrangements 12, 13 in spanwise direction x of the wind turbine blade 2 is shown. Thereby, the curve 17 shows the voltage distribution in the first electrical down conductor 12 in the first half-shell 6 and the curve 18 shows the voltage distribution in the second lightning down conductor arrangement 13 in the second half-shell 7.

The voltage V is plotted in arbitrary units, since the absolute value of the voltage during the lightning strike may depend on the intensity of the lightning strike and is therefore not known exactly beforehand. However, the course of the curves 17, 18, hence the voltage distribution in the spanwise direction x of the blade 2 remains the same independent of the absolute value of the voltage V. Therefore, the voltage at a root-side end contact between the lightning down conductor arrangements 12, 13, which is located at the spanwise position $x_0$, is denoted as reference voltage $V_{ref}$. The maximum voltage by a lightning strike hitting the wind turbine blade 2 in the tip-end 9 is denoted as $V_{max}$, wherein the position of the tip-end contact is denoted as $x_3$. Between the position $x_0$ of the root-side contact and the position $x_3$ of the tip-side contact, two additional spanwise positions $x_1$ and $x_2$ are marked.

As can be easily seen from the diagram, the curve 17 and the curve 18 each show a non-linear voltage distribution over the spanwise length x of the wind turbine blade 2. This non-linear voltage distribution is originated in the shape of the spar caps 10, 11, which are electrically connected by the plurality of connections 14, 15 to the respective lightning down conductor arrangements 12, 13. Therefore, also in the lightning down conductor arrangements 12, 13, a non-linear voltage distribution in spanwise direction x is obtained.

To understand the origin of this effect, FIG. 4 shows a schematic depiction of a cross-section of the spar cap 10. The cross-sectional area is shown in the spanwise direction x and the height direction z of the blade and hence in a plane orthogonal to the chord-wise direction y.

As can be seen, between the positions $x_0$ and $x_1$, the thickness of the spar cap 10, 11 increases. Hence, in this section spanning from the root-side end 8, or the end $x_0$ of a corresponding root-side end portion 19, respectively, towards a midspan position $x_1$, the thickness of the spar cap 10 increases.

In an intermediate subsection of the spar cap 10, 11 between the midspan positions $x_1$ and $x_2$, the thickness of the spar cap remains constant, so that also the voltage drop over the spar cap 10, 11 and hence over the lightning down conductor arrangements 12, or 13, respectively, remains approximately constant, as can be seen in FIG. 3. In the section closer to the tip between the spanwise positions $x_2$ and $x_3$, the thickness of the spar cap 10 decreases so that also the voltage drop in this section is non-linear, as can be seen from FIG. 3.

The linear curve 27 in FIG. 3 shows the voltage distribution over the further electrical conductor 16 in the case that it is not electrically connected to the lightning down conductor arrangements 12, 13. The only electrical connection, in which the voltage is in the further electrical conductor 16 and the down conductors 12, 13 is equal, is at the root-side contact at the position $x_0$. The further electrical conductor 16 in particular comprises a constant cross-section so that the voltage drop over the length of the further electrical conductor 16 remains constant.

However, as can be seen at certain spanwise positions, large voltage differences $\Delta V$ between the electrical potential of the further electrical conductor 16 and the lightning down conductor arrangements 12, 13 may occur. The absolute voltage difference $\Delta V$ between the further electrical conductor 16 and the so-called shell conductors comprising each one spar cap 10, 11 and one of the lightning down conductor arrangements 12, 13 may differ widely at different spanwise positions and could produce risky voltage differences $\Delta V$ between the conductors.

In case of a lightning strike, such voltage differences $\Delta V$ may cause a flashover in the interior of the blade, which may cause lightning strike-induced damage in the wind turbine blade 2. Therefore, an additional electrical bonding of the further electrical conductor 16 to the other conductors of the wind turbine blade 2 is required.

Referring back to FIG. 2, the electrical integration of the further electrical conductor 16 is shown. In FIG. 2, the further electrical conductor 16, the spar caps 10, 11 and the down conductors 12, 13 are shown only between a root-side end portion 19 and a tip-side end portion 20 within a section 21. It is possible that in the root-side end portion 19 and/or in the tip-side end portion 20, an electrical connection between the spar caps 10, 11 as well as the lightning down conductor arrangements 12, 13 and the further electrical connector 16 is applied, as it was assumed for instance in FIG. 3 directly at the positions $x_0$ and $x_3$.

However, in the section 21 between the root-side end portion 19 and the tip-side end portion 20, each spar cap 10, 11 is only connected electrically to one of the lightning down conductor arrangements 12, 13. Also the further electrical conductor 16 is electrically connected only to one of the lightning down conductor arrangements, namely the lightning down conductor arrangement 12, or to the respective spar cap 10, respectively. Within the section 21, there are no electrical connections between the further electrical conductor 16 and the lightning down conductor arrangement 13, or the spar cap 11 of the second half-shell 7, respectively.

The section 21 may extend over at least 50% of the spanwise length x of the blade 2. In an embodiment, the section 21 extends over at least 60%, 70%, 80% or 90% of the spanwise length of the blade. Also, any value between 50% and 90% and/or values more than 90% are possible for the spanwise length of the section 21.

By applying only electrical connections between the further electrical conductor 16 and the spar cap 10 and/or the lightning down conductor arrangement 12 in the first half-shell 6, the fabrication of the wind turbine blade 2 can be significantly facilitated. The further electrical conductor 16 can be integrated in the first half-shell 6 so that after the joining of the two half-shells 6, 7 for forming the entire wind turbine blade 2, no electrical connections in the section 21 have to be established.

The electrical connection of the further electrical conductor 16 to exactly one lightning down conductor arrangement 12, or to exactly one spar cap 10, respectively, is sufficient for avoiding large voltage differences $\Delta V$ in the wind turbine blade 2 in case of a lightning strike. This protects the wind turbine blade 2 from internal flashovers in case of a lightning strike and significantly facilitates the manufacture of the wind turbine blade 2.

The electrical connection between the further electrical conductor 16 and the lightning down conductor arrangement 12 occurs at a plurality of connection positions 22. The electrical connection may occur by using for instance an electrical connection means 28 at the connection positions 22. The electrical connection means 28 may be for instance a cable, or another type of electrically conductive component. The connection means 28 may be for instance an electrically conductive bracket, for instance a metal bracket, a metal block, an electrically conductive screw or the like. Also, a realization of the connection means 28 as a sheet of an electrically conductive fiber material, for instance a carbon fiber-based material, is possible.

The electrical connection between the further electrical conductor 16 and the down conductor 12 at the connection positions 22 creates an electrical bonding, or a potential equalization, between the further electrical conductor 16 and the down conductor 12. The effect of the electrical connection between the further electrical conductor 16 and the down conductor 12 is described in relation to the FIGS. 5 to 7, which each show a different embodiment of a wind turbine blade 2 comprising a different number of electrical connections between the further electrical conductor 16 and the down conductor 12.

In FIG. 5, the voltage distribution in a first embodiment of a wind turbine blade 2 is shown. In this embodiment, the further electrical conductor 16 is electrically connected to the lightning down conductor arrangement 12 at a root-side end contact denoted as CPR. A further electrical connection between the further down conductor 16 and the lightning down conductor arrangement 12 occurs at a tip-side end contact denoted CPT. The root-side end connection position CPR lies within the root-side end portion 19 of the wind turbine blade 2. Correspondingly, the tip-side connection position CPT lies in the tip-side end portion 20. For the sake of simplicity, it is assumed that the position root-side end contact CPR is equal to the end of the root-side end portion 19 at the position $x_0$. Correspondingly, it is assumed that the position of the tip-side end contact CPT is equal to the end of the tip-side end portion 20 at the position $x_3$.

In the section 21 between the root-side end portion 19 and the tip-side end portion 20, one electrical connection between the further electrical conductor 16 and the down conductor 12 is established at a first connection position 22 denoted as CP1.

As can be seen from the curve 17, which shows the potential distribution in the lightning down conductor arrangement 12, and the curve 27, which shows the voltage distribution in the further electrical conductor 16, at the connection positions CP1, the potentials in the further electrical conductor 16 and the first down conductor 12 are equal. By applying an electrical connection at the connection position 22, the voltage differences $\Delta V$, which occur between the further electrical conductor 16 and one of the down conductors 12, 13 become smaller. Since the electrical connection between the further electrical conductor 16 and the lightning down conductor arrangement 12 also affects the voltage distribution in the lightning down conductor arrangement 12, the shape of the voltage distributions in the lightning down conductor arrangements 12, 13 become slightly different from the case without a connection to the further electrical conductor 16, which was shown in FIG. 3.

By applying additional electrical connections at more connection positions 22, the voltage differences $\Delta V$ that may occur between the further electrical conductor 16 and the lightning down conductor arrangements 12, 13 can be further reduced.

In FIG. 6, the voltage distribution in a second embodiment of a wind turbine blade 2 is shown. In this embodiment, the further electrical conductor 16 is connected to the first lightning down conductor arrangement 12 within the section 21 at three connection positions 22 indicated as CP1, CP2 and CP3. As it is apparent from the diagram, the maximum voltage difference $\Delta V$ is further reduced.

Correspondingly, FIG. 7 shows the voltage distribution in a third embodiment of a wind turbine blade 2, in which the further electrical conductor 16 is connected at four connections positions 22 indicated as CP1, CP2, CP3 and CP4 to the first lightning down conductor arrangement 12 in the section 21. Apparently, a further reduction of the maximum voltage difference $\Delta V$ is achieved.

Apparently, the maximal voltage differences $\Delta V$ appears in the sections with the non-linear voltage distribution, hence between the positions $x_0$ and $x_1$ as well as between $x_2$ and $x_3$. Therefore, the section 21 may be divided in a root-side subsection 23, which is adjacent to the root-side end portion 19, a tip-side subsection 24, which is adjacent to the tip-side end portion 20, and an intermediate subsection 25 between the root-side subsection 23 and the tip-side subsection 24. The respective subsections of the section 21 are schematically indicated in FIG. 7.

The root-side subsection 23 spans between the position $x_0$ and $x_1$. Correspondingly, the tip-side subsection 24 spans between the positions $x_2$ and $x_3$, wherein the intermediate subsection 25 spans between the position $x_1$ and $x_2$. Thereby, the exact positions of the root-side subsection 23 and the tip-side subsection 24 as well as the intermediate subsection 25 correspond to the shape of the spar cap 10 as shown in FIG. 4.

In an embodiment, it may be provided that in the root-side subsection 23 and/or in the tip-side subjection 24, the distance between two adjacent connection positions CPx is smaller than in the intermediate subsection 25. This may be achieved for instance by introducing additional electrical contacts at connection positions 22 denoted as CPA1 and CPA2 within the root-side subsection 23, or the tip-side subsection 24, respectively.

In all diagrams, it is assumed that the electrical contact CPR at a root-side end and the electrical contact CPT at a tip-side end are directly located at the positions $x_0$ or $x_3$, respectively, which denote the ends of the root-side end portion 19 and/or the tip-side end portion 20, respectively. However, also a different location of the electrical contact CPR at the root-side end and the electrical contact CPT at the tip-side end and/or the omittance of one or both of these contacts is possible.

It is possible in all embodiments that also in the second half-shell 7 an additional further electrical conductor 16 is arranged. This additional further electrical conductor 16 would be connected only to the lightning down conductor arrangement 13 and/or the spar cap 11 within the section 21. If a plurality of further electrical conductor 16 is arranged in the blade 2, the distribution of the further electrical conductor 16 in the half-shells 6 or 7 is in particular such that the number of further electrical conductor 16 is equal or differs by only one between the half-shells 6, 7. This allows for creating less voltage differences between the lightning down conductor arrangements 12, 13 and/or the spar caps 10, 11, respectively.

Although the present invention has been disclosed in the form of embodiments and variations thereon, it will be understood that numerous additional modifications and variations could be made thereto without departing from the scope of the invention.

For sake of clarity, it is to be understood that the use of "a" or "an" throughout this application does not exclude a plurality, and "comprising" does not exclude other steps or elements.

The invention claimed is:

1. A wind turbine blade comprising two electrically conductive spar caps, two lightning down conductor arrangements, and a further electrical conductor, wherein the spar caps and the lightning down conductor arrangements extend along a spanwise direction of the blade at least between a root-side end portion and a tip-side end portion of the blade, wherein each of the spar caps is electrically connected to only a respective one of the lightning down conductor arrangements within a section of the blade between the root-side end portion and the tip-side end portion, wherein the further electrical conductor is electrically connected within the section to only one of the spar caps and/or to only one of the lightning down conductor arrangements, and wherein the further electrical conductor is connected to at least one of the spar caps and/or at least one of the lightning down conductor arrangements at a plurality of connection positions, wherein the plurality of connection positions are offset in the spanwise direction of the blade, and wherein the further electrical conductor comprises one or more signal cables and a shield conductor, wherein the shield conductor is electrically connected to at least one of the spar caps and/or at least one of the lightning down conductor arrangements.

2. The wind turbine blade according to claim 1, wherein the section extends over at least 50% of a spanwise length of the blade.

3. The wind turbine blade according to claim 1, wherein the section comprises a root-side subsection adjacent to the root-side end portion, a tip-side subsection adjacent to the tip-side end portion and an intermediate subsection between the root-side subsection and the tip-side subsection, wherein in the root-side subsection and/or the tip-side subsection, a distance between two adjacent connection positions of the plurality of connection positions is smaller than in the intermediate subsection.

4. The wind turbine blade according to claim 1, wherein the further electrical conductor is connected to at least one of the spar caps and/or at least one of the lightning down conductor arrangements via at least one of the plurality of connection positions by at least one electrically conductive connection.

5. The wind turbine blade according to claim 1, wherein the further electrical conductor is arranged at a shear web structure of the blade and/or that the further electrical conductor is arranged at or within a portion of a shell of the blade.

6. The wind turbine blade according to claim 1, wherein the spar caps, the lightning down conductor arrangements and the further electrical conductor are electrically connected in the root-side end portion at a root-side contact and/or in the tip-side end portion at a tip-side contact.

7. The wind turbine blade according to claim 1, wherein the further electrical conductor extends from the root-side end portion, wherein the further electrical conductor comprises a length of at least 10 m and/or wherein the further electrical conductor extends to the tip-side end portion.

8. The wind turbine blade according to claim 1, wherein at least one of the spar caps and/or at least one of the lightning down conductor arrangements is connected to the further electrical conductor within the section.

9. The wind turbine blade according to claim 1, wherein the further electrical conductor is connected to at least one sensor and/or at least one actuator.

10. The wind turbine blade according to claim 1, wherein the spar caps comprise or consist of a carbon fiber-based material.

11. The wind turbine blade according to claim 1, wherein the blade comprises two half-shells forming a shell of the blade, wherein each half-shell comprises one of the spar caps.

12. A wind turbine comprising at least one wind turbine blade according to claim 1.

* * * * *